Feb. 7, 1967 W. R. MARTINI 3,303,361
CRITICAL POINT TEMPERATURE CONTROL METHOD AND
DEVICE FOR A THERMIONIC GENERATOR
Filed Dec. 4, 1964 2 Sheets-Sheet 1
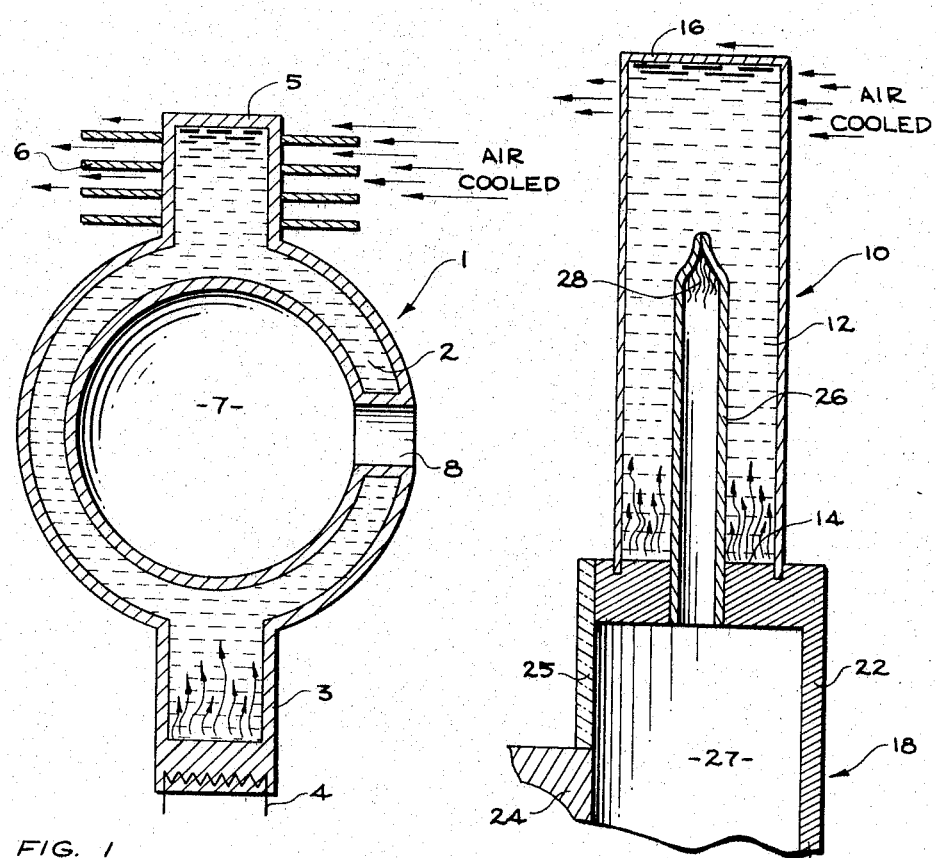
FIG. 1
FIG. 2
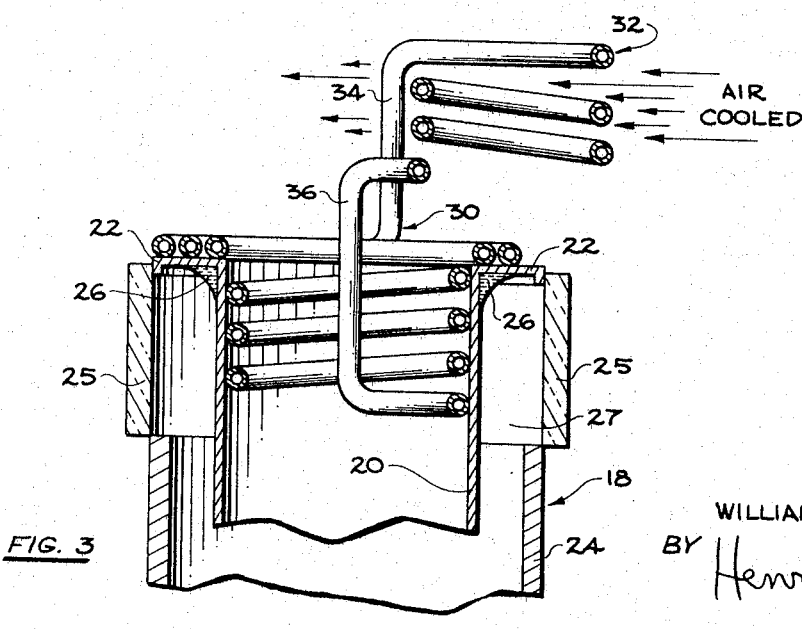
FIG. 3
INVENTOR
WILLIAM R. MARTINI
BY Henry Kolin
ATTORNEY INVENTOR
WILLIAM R. MARTINI
BY Henry Kolin
ATTORNEY United States Patent Office 3,303,361
Patented Feb. 7, 1967

3,303,361
CRITICAL POINT TEMPERATURE CONTROL METHOD AND DEVICE FOR A THERMIONIC GENERATOR
William R. Martini, Northridge, Calif., assignor to North American Aviation, Inc.
Filed Dec. 4, 1964, Ser. No. 416,032
7 Claims. (Cl. 310—4)

This application is a continuation-in-part of my application Serial No. 241,274, filed November 30, 1962, now abandoned.

The present invention is directed to temperature control methods and devices utilizing the critical point of a liquid.

Precise temperature control in a simple and convenient manner is of increasing importance in the utilization of many electrical and electronic devices. In several such devices it is important that a uniform temperature be maintained independent of variations in ambient temperature, pressure, or acceleration due to gravity. Thus many high frequency crystals, precision transformers, computer elements, and thermionic diodes require such precise temperature control. While the critical point temperature control device and method of the present invention is suitable for a wide variety of applications, for purposes of illustration it will be discussed particularly in conjunction with the temperature control of the plasma reservoir of a thermionic diode.

In the use of thermionic diode converters for converting heat to electrical energy, the pressure of the plasma, namely, cesium, is a critical operating parameter and must be maintained within prescribed pressure limits for efficient operation of the diode. Since the cathodes of such diodes operate at from 1500° C. to 2000° C. and the cesium reservoir must be maintained at a temperature of less than 500° C., it has been the practice in the prior art to incorporate long extensions on the diode so that the plasma reservoir could be physically removed from the high temperature environment. Such arrangements while successfully reducing the reservoir temperature to the desired range, have required intricate structural arrangements including diode extensions which are inconvenient and cumbersome.

It is an object of the present invention to provide a temperature control device free from the limitation of prior art devices with respect to variations in temperature, pressure, and gravity.

It is another object to provide such a device which is completely insensitive to ambient pressure and is also insensitive to local acceleration of gravity so long as it does not approach zero.

It is yet another object of the present invention to provide such a device which is insensitive to changes in ambient temperature and ambient air velocity over a wide range without the use of temperature sensing controllers.

It is still another object to provide a method for operating such a device.

It is yet another object to provide a simplified temperature control device and method for controlling the temperature of the plasma reservoir of a thermionic diode converter.

It is another object to provide a compact, rugged, simple plasma reservoir temperature control and method particularly suited for use in portable thermionic power supplies.

In accordance with this invention, a temperature control device is provided comprising a container whose central portion is a temperature controlled chamber, the device being in vertical orientation and partially filled with a selected fluid in heat-exchanging relation with the temperature controlled chamber. In operation, the fluid heat transfer medium is maintained near its critical temperature and pressure (critical point). Heat is provided at the bottom of the device so that the fluid in contact with that zone will be somewhat above the critical temperature. Heat is removed from the top of the device so that the fluid in contact with that zone is at or below the critical temperature.

At the critical point the distinction between saturated liquid, and saturated vapor disappears. As the critical point is approached rapid changes in properties greatly enhance the ability of the fluid to transport heat in an upward direction over what it would have for a simple boiling-condensing cycle. The boiling-condensing cycle does transport heat rapidly and therefore controls temperature to the boiling point of the liquid. But this boiling point is a function of the applied pressure. In a simple closed system as is described, the pressure changes with temperature, and therefore temperature control is not attained if the temperature is below the critical temperature. If the temperature of the bottom of the device is above the critical temperature and if the fluid inventory is such that the critical pressure is also approached, then fluid at very nearly the critical temperature will occupy the central portion of the device. At exactly the critical point, heat transfer by natural convection approaches infinity and hence the temperature gradient along the device approaches zero. For example, the effective upward thermal conductivity of carbon dioxide, whose critical temperature is 31° C. increases from 1000 times an equivalent volume of copper for simply boiling-condensing to more than 4000 times that of pure copper for critical point heat transfer. This transition occurs as the temperature of the vessel containing the carbon dioxide increases from 28° C. to 30.5° C. Thus the non-linear heat transfer characteristics of a fluid at its critical temperature, and its independence of the ambient pressure or gravity, are utilized to maintain the temperature controlled chamber at a desired working temperature. By "vertical orientation" is meant any inclination from a horizontal plane, although the device will function at maximum efficiency when maintained at right angles to the horizontal plane.

The foregoing and other objects and features of the present invention will be more fully understood from the following detailed description and drawings in which:

FIG. 1 is a sectional view of one embodiment of the present invention;

FIG. 2 is a sectional view of a second embodiment of the present invention in relation to a thermionic device;

FIG. 3 is a sectional view of another embodiment of a thermionic device;

Figure 4:
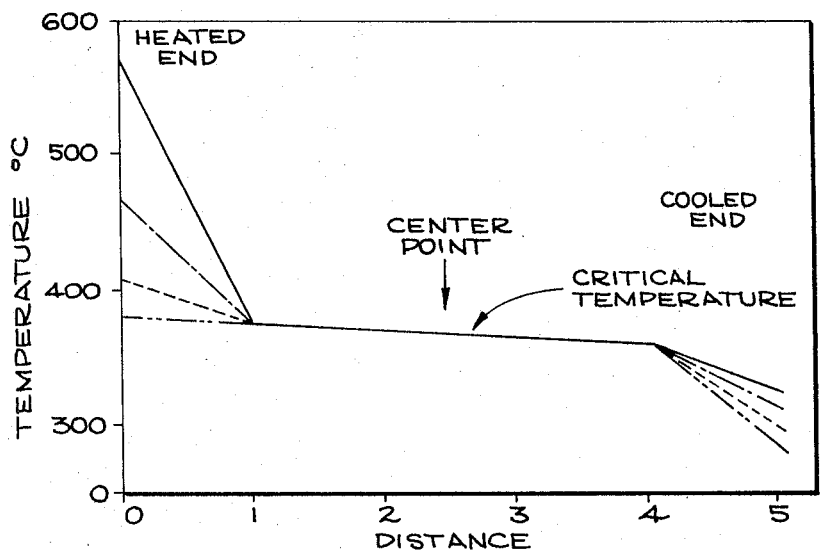
FIG. 4 is a graphical representation of the temperature maintained in the device as a function of distance from the heat source applied at the bottom of the device.

Referring to FIG. 1, an enclosed volume in a temperature control device 1 is shown partially filled with a fluid 2. The amount of fluid added is such that the fluid will preferably be at or close to its critical density at the critical point. Thus where a volume of 10 cubic centimeters is present, about 3.23 grams of water will be added, since the critical density of water is .323 g./cc. The device 1 is maintained in a vertical orientation with the bottom portion 3 having heating means 4, shown as an electric coil, so that the liquid 2 may be brought to the vapor state. The top portion 5 of the device is provided with cooling means 6, shown as cooling fins, so that heat may be removed from the liquid to have it condense and by convention return to the bottom portion of the device. The central chamber 7, in which constant temperature conditions are maintained, is shown conveniently in the form of a spherical chamber around the outside of which the temperature stabilizing fluid flows. Any other convenient shape or arrangement may be used for the temperature stabilized chamber depending upon the specific application of interest. An opening 8 into chamber 7 is used for introducing the material to be maintained at a stabilized constant temperature. Depending upon the particular application of interest, heating means 4 and cooling means 6 may either be integral with device 1, as shown, or may be separated therefrom. Thus for certain applications a blast of hot gas may be used for heating the bottom portion of the device while a stream of cool air may be used for cooling the top portion of the device.

The choice of fluid for use in the sealed volume of the device will depend upon the temperature that it is desired to maintain in the constant temperature chamber 7. The fluid must be chemically stable at its critical point. The selection of the container material used for the device will be governed by the critical pressure and the critical temperature of the liquid selected and by the chemical inertness of the material to this liquid. Stainless steel is particularly suitable as a material of construction in this regard. In Table I below are listed the critical constants of several fluids considered suitable for use in the device for maintaining a controlled temperature.

TABLE I.—CRITICAL CONSTANTS FOR SELECTED FLUIDS

| Material | Critical Temperature (°C.) | Critical Pressure (atm.) |
| --- | --- | --- |
| Carbon dioxide | 31.1 | 73.0 |
| Ammonia | 132.4 | 111.5 |
| n-Butane | 153 | 36 |
| Sulfur dioxide | 157.2 | 77.7 |
| Dichloromonofluoromethane | 178.5 | 51 |
| Trichloromonofluoromethane | 198 | 43.2 |
| Freon 112 | 278 | 34 |
| Perfluorobenzene | 288 | 48 |
| Perfluorotoluene | 320 | 42 |
| Water | 374.0 | 217.7 |

The fluids listed in Table I are illustrative of many other materials that may be used. Also, mixtures may be used to control temperature at intermediate points. Thus, it is possible to attain a controlled temperature of approximately 300° C. by mixing perfluorobenzene with perfluorotoluene.

In FIG. 2 is shown an embodiment illustrating the use of the temperature control device as a part of a thermionic converter device. A capsule 10 partially filled with a liquid 12 and sealed off is oriented in a vertical orientation with the bottom 14 heated and the top 16 cooled. Preferably, no permanent gas should be in the capsule but the amount of liquid should be controlled so that the fluid will have near the critical density at the critical temperature. The liquid will vaporize at the bottom 14 of the capsule, rise to the top, condense, and fall back down again. The rate of heat transfer by this mechanism is quite high due to the fact that the boiling heat transfer coefficient for most liquids and the condensing heat transfer coefficient are both high. The temperature of the central portion of this capsule depends upon the capsule pressure. With the correct preselected amount of liquid charged into the capsule, as the temperature of the capsule is increased, the capsule attains the critical temperature and the critical pressure for the liquid. At this point the liquid ceases to exist and there is no differentiation between liquid and vapor phases. As the temperature of the liquid approaches the critical temperature the specific heat and coefficient of expansion of both the saturated liquid and vapor increase very rapidly, and the viscosity and thermal conductivity of the saturated liquid and vapor change rapidly. All these rapid changes cause an extremely sharp increase in the ability of the capsule to transfer heat in a vertical direction by natural convection heat transfer. This non-linear heat transfer as the critical point is approached is the basis of the simple temperature control of the present invention. When the thermionic converter 18 is turned on, the first part of the diode to get hot is the cathode 20. This is followed by the cathode lead 22 and then eventually the anode 24, supported by anode support member 25. The cesium or other plasma source is held in the reservoir 26 by surface tension. A knitted wire body 28 lends support to the cesium. Heat is transferred to the bottom of the capsule 14 by the cathode lead 22 and is removed from the top of the capsule 16 by natural convection and radiation. The center portion of this capsule 10 in which reservoir 26 is positioned will remain very near the critical temperature for the liquid filling the capsule over a wide range of power inputs and cooling rates once a minimum power input has been exceeded.

One example of the temperature control device of the present invention included a stainless steel capsule about 6 inches long filled with 0.8 gram of water, the remaining space in the capsule being filled with air at one atmosphere of pressure. The air is not desirable because it interferes with the starting of natural convection currents. The capsule was welded shut. The bottom inch of the capsule was heated and the top inch of the capsule was cooled with a fan. During operation, water would boil at the bottom of the tube, and the steam would rise to the top, condense, and fall back again. As the heat input to the bottom inch rose above a certain minimum value, the temperature of the central portion remained constant at 370° C. This constant temperature was maintained in the central portion of the capsule over a wide range of applied temperatures.

Another embodiment of the present invention is shown in FIG. 3. A thermionic diode 18 has a cylindrical cathode 20, cathode lead 22, a cylindrical anode 24, an anode support member 25 of electrical insulation connecting the cathode and anode to form a chamber 27 in which a cesium reservoir 26 is held by surface tension. Adjacent the reservoir 26 and in contact with the cathode lead 22 is a continuous tube 30 which is partially filled with fluid, e.g., water, as in the previous embodiment, or other liquid. As the cathode lead 22 heats during operation of the diode 18, this heat is transferred to the tube 30 and the fluid contained therein. The heated fluid is circulated through the tube 30 by convection circulation since the upper end 32 is cooled by air or similar means while the lower end is in direct contact with the cathode lead 22. In this manner, with a predetermined amount of heat transfer medium in tube 30, when the medium attains critical temperature and pressure, the thermal conductivity increases rapidly and the cesium reservoir which is in contact with the center portion of the tube 30 will be maintained between predetermined temperature limits. The limits are determined by the critical temperature of the liquid. In the continuous tube 30 of this embodiment the critical fluid will circulate up through the hot leg 34 of the circuit and down through the cold leg 36 of the circuit. Once equilibrium is attained this circulation will be rapid and will maintain the central portion of the tube 30 adjacent the reservoir 26 within the narrow temperature limits desired.

For a more detailed illustration of one thermionic diode that may be used in the practice of the current invention, reference should be made to my copending application, Serial No. 241,328, filed November 30, 1962, entitled, "Regenerative Thermionic Diode."

In FIG. 4 is shown a graphical relationship of temperature plotted as a function of distance along a capsule of the type illustrated in FIG. 2, the capsule being partially filled with water. Despite variations in temperature input, the temperature of the central portion of the capsule never rose above about 370° C. As indicated by the constant temperature of the air-cooled portion of the capsule, the heat removal was substantially constant. A small increase in heat input to the bottom served only to increase the temperature of the bottom portion of the capsule until heat loss by other means balanced the additional heat input. The temperature of the central portion remained constant, but the temperature gradient increased a small amount with increased temperature at the bottom. Since in the embodiment shown in FIG. 2 the cesium reservoir is positioned midway up the capsule, it is therefore only necessary that the temperature at the bottom of the temperature control capsule be above the critical temperature of the fluid in the capsule and that the critical temperature of the fluid should be the optimum cesium reservoir temperature.

Of course it is possible by increasing the cooling drastically to drop the temperature of the central portion of the curve of FIG. 4 below 370° C.; conversely, by cutting off the cooling to the tube the central portion temperature may be made to rise above 370° C. Nevertheless, for a wide range of copper bar temperatures, an extremely constant central temperature for the capsule resulted, as shown in FIG. 4.

Figure 5:
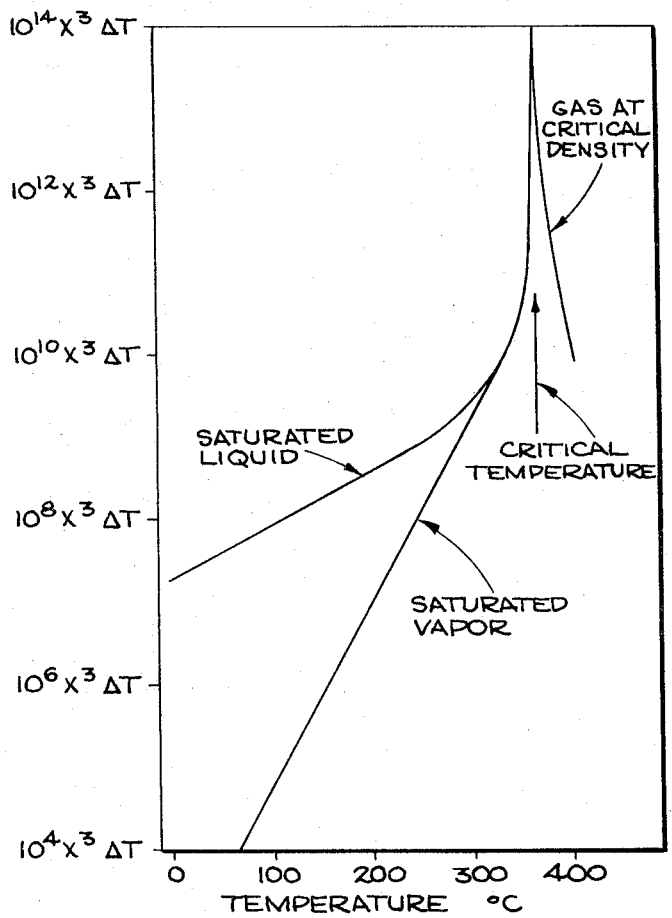
FIG. 5 is a graphical representation of the Rayleigh number for water plotted as a function of temperature.

In FIG. 5 is shown the computed Rayleigh number for water plotted as a function of temperature. The Rayleigh number is proportional to the heat transfer characteristics of a fluid by natural convection. This number may be defined as $$Ra = \frac{x^3 \rho^2 g \beta (\Delta T) C_p}{\mu k}$$

where $x$ = characteristic dimension of the confined space,
$\rho$ = density of fluid,
$g$ = local acceleration due to gravity,
$\beta$ = coefficient of volumetric expansion,
$\Delta T$ = temperature difference,
$C_p$ = specific heat at constant pressure,
$\mu$ = viscosity, and
$k$ = thermal conductivity.

Since sufficient data is available for the properties of water, the Rayleigh number can be evaluated for both the saturated liquid and vapor as the critical temperature is approached. It is noted that as the critical temperature is approached, the Rayleigh number for saturated liquid and saturated vapor approach each other, and both increase rapidly with temperature. At the critical temperature point, the Rayleigh number approaches infinity, that is heat transfer within the system takes place with a vanishingly small temperature drop.

This phenomenon in which the Rayleigh number increases extremely rapidly as the critical temperature is approached is not considered unique to water but is applicable, in some degree, to all fluids. The critical temperature and pressure of illustrative selected fluids which have adequate thermal stability to be used at the critical temperature is shown in Table I.

It will, of course, be understood that fluids other than those illustrated may be used as critical-point liquids in the practice of this invention. Similarly, structural configurations other than those specifically illustrated may be used depending on whether the heating and cooling are self-contained within temperature controlled device, or whether the device depends for its heat exchange on being inserted within a system where the heating and cooling will occur as part of the functioning of the system. These various modifications are considered as falling within the scope of the present invention. Accordingly, the scope of the present invention should be determined in accordance with the objects and the claims herein.

I claim:
1. A temperature control device for maintaining the central portion of a container at a substantially uniform temperature which is the critical temperature of a preselected fluid heat transfer medium, said device comprising:
   a container, one end of said container being in heat-exchanging relation with a source of heat, the other end of said container being in heat-exchanging relation with a cooling source;
   a sealed volume to be temperature controlled, the central portion of said container being located in heat-exchanging relation therewith;
   and a fluid heat transfer medium in a preselected amount by weight, said sealed volume being partially filled with said fluid heat transfer medium, the ratio of the weight of said fluid to said sealed volume being substantially equal to the critical density of said fluid at the critical temperature thereof at which temperature said volume is to be maintained.

2. A temperature control device for maintaining the central portion of a container at a substantially uniform temperature which is the critical temperature of a preselected fluid heat transfer medium, comprising:
   a container in vertical orientation;
   means for heating said container associated with the lower end of said container;
   means for cooling said container associated with the upper end of said container;
   a sealed volume to be temperature controlled, the central portion of said container being in heat-exchanging relation therewith;
   and a fluid heat transfer medium in a preselected amount by weight, said sealed volume being partially filled with said fluid heat transfer medium, the ratio of the weight of said fluid to said sealed volume being substantially equal to the critical density of said fluid at the critical temperature thereof at which temperature said volume is to be maintained.

3. The combination of a thermionic diode and a temperature control device therefor, said diode including:
   an envelope;
   a cathode disposed therein;
   a source of thermal energy for supplying heat to said cathode;
   an anode in cooperative relation with said cathode; and
   a plasma source reservoir for providing an ionized plasma at least partially disposed between said cathode and said anode during operation of said diode;
   said temperature control device serving to maintain the plasma source reservoir of said diode at a substantially uniform temperature which is the critical temperature of a preselected fluid heat transfer medium, said temperature control device comprising;
      a container, one end of said container being in heat-exchanging relationship with the heat source for said cathode, the other end of said container being remotely positioned with respect to said cathode;
      means for cooling the other end of said container;
      a sealed volume to be temperature controlled, the central portion of said container being located adjacent said reservoir and in heat-exchanging relationship with said sealed volume;
   and a fluid heat transfer medium in a preselected amount by weight, said sealed volume being partially filled with said fluid heat transfer medium, the ratio of the weight of said fluid to said sealed volume being substantially equal to the critical density of said fluid at the critical temperature thereof at which temperature the plasma source reservoir is to be maintained.

4. The combination of claim 3 wherein said diode has a cathode lead, said cathode lead defining said reservoir, and said container is a continuous tube having a cold leg and a hot leg, the central portion of said tube being in contact with said cathode lead.

5. The combination of claim 3 wherein said plasma reservoir includes a tube, said tube being located within said container and having one end communicating with the interior of said diode.

6. The method of maintaining the central portion of a container at a substantially uniform temperature which is the critical temperature of a preselected fluid heat transfer medium, said central portion being located in heat-exchanging relation with a sealed volume which is partially filled with a preselected amount by weight of said fluid heat transfer medium so that the ratio of the weight of said fluid to said sealed volume is substantially equal to the critical density of said fluid at the critical temperature thereof at which temperature said volume is to be maintained, comprising:

positioning said fluid-filled sealed volume in substantially vertical orientation, heating the lower end of said sealed volume above the critical temperature point of said fluid, and removing heat from the upper end of said container so as to maintain this end at a temperature below the critical point of said fluid, whereby convection circulation of said fluid occurs to maintain the volume to be controlled at the critical temperature of said fluid.

7. The method according to claim 6 wherein said sealed volume is in heat-exchanging relation with the plasma reservoir of a thermionic diode.

References Cited by the Examiner

UNITED STATES PATENTS

| | | | |
|---|---|---|---|
| 2,510,397 | 5/1950 | Hansell | 310—4 |
| 2,980,819 | 4/1961 | Feaster | 310—4 |
| 3,002,116 | 9/1961 | Fisher | 310—4 |
| 3,089,972 | 5/1963 | Larson | 313—34 |

FOREIGN PATENTS

| | | |
|---|---|---|
| 854,036 | 11/1960 | Great Britain. |
| 947,281 | 1/1964 | Great Britain. |

MILTON O. HIRSHFIELD, *Primary Examiner.*

J. W. GIBBS, *Assistant Examiner.*